United States Patent Office 2,856,279
Patented Oct. 14, 1958

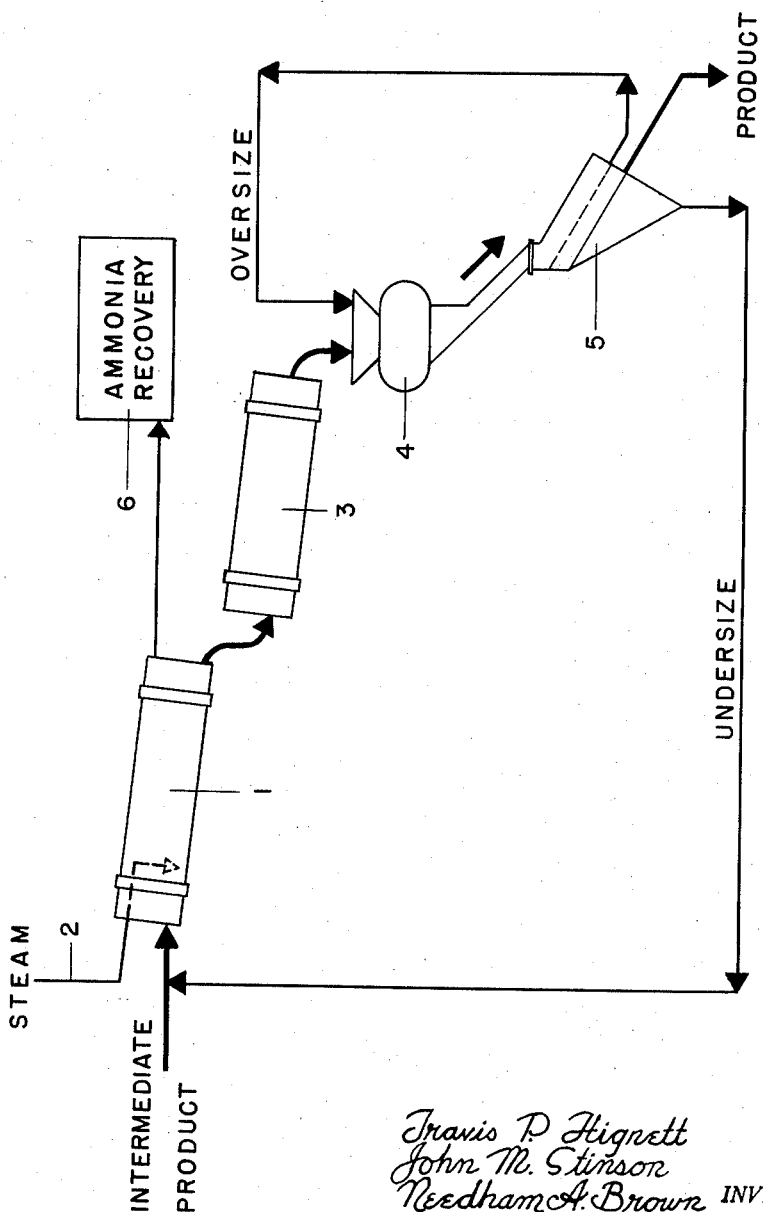

2,856,279
NITROGEN-PHOSPHORUS COMPOUNDS

Travis P. Hignett, John M. Stinson, and Needham A. Brown, Sheffield, and Maurice C. Nason, Florence, Ala., assignors to Tennessee Valley Authority, a corporation of the United States Application December 19, 1955, Serial No. 554,106

6 Claims. (Cl. 71—35)

(Granted under Title 35, U. S. Code (1952), sec. 266)

The invention herein described may be manufactured and used by or for the Government for governmental purposes without the payment to us of any royalty therefor.

This invention relates to the production of compounds containing nitrogen and phosphorus. It relates in particular to the hydrolysis of a mixture of nitrogen-phosphorus compounds obtained by reacting phosphorus, dry air, and ammonia to yield a hard, dense product that has handling characteristics suitable for use as a fertilizer.

John C. Driskell, in U. S. Patent 2,713,536, has described a method for preparing a mixture of nitrogen-phosphorus compounds. His method comprises the steps of oxidizing elemental phosphorus with dry air; cooling the products of combustion to a temperature of 450° to 950° F.; reacting the phosphorus pentoxide vapor in the cooled combustion products with anhydrous ammonia; and collecting the solid, finely divided reaction product. The proportion of ammonia reacted with phosphorus pentoxide is within the range of 2.1 to 2.7 moles $NH_3$ per mole of $P_2O_5$. The product obtained by this method is an intimate mixture of ammonium metaphosphate ($NH_4PO_3$), phosphoronitridic acid [$(OH)_2PN$], and ammonium phosphoronitridate ($NH_4OOHPN$). The atomic ratio of nitrogen to phosphorus in the product is between 1.05 and 1.35. From 60 to 75 percent of the nitrogen is in ammoniacal form.

This process is an advantageous method for making nitrogen-phosphorus compounds. The product is an excellent source of nutrient nitrogen and phosphorus for growing plants. The product, however, has two properties that adversely affect its value as a fertilizer. These properties are its high hygroscopicity and its low bulk density. The present process has to do with the treatment of the product described and claimed in U. S. Patent 2,713,536. For the sake of convenience and brevity, we refer in the following specification to this material as the "intermediate product."

An object of this invention is to provide a process for treating the intermediate product to produce a material of substantially lower hygroscopicity.

Another object is to provide a process for preparing a granular fertilizer material of increased bulk density from the intermediate product.

Other objects and advantages of our invention will become apparent as this disclosure proceeds.

We have found that these objects may be attained by partially hydrolyzing the non-ammoniacal nitrogen in the nitrogen-phosphorus compounds comprising the intermediate product. We accomplish this partial hydrolysis by treating the intermediate product with water in an amount such that the ratio of ammoniacal nitrogen to total nitrogen in the final product is within the range of about 0.80 to 0.95 and maintaining the temperature of the material during said water treatment within the range of about 200° to 500° F., preferably about 225° to 300° F. The temperature range may be extended above 500° F. to the temperature of decomposition of the material.

At 600° F., decomposition is rapid and there is severe loss of ammonia; but it is feasible to operate at somewhat above 500° F.

The water employed in our process may be in liquid or vapor form.

The product obtained by our procedure is substantially less hygroscopic than the intermediate product and has a higher bulk density. Its agronomic value, in terms of plant-growth response, is about 10 to 15 percent better than that of the intermediate product.

As stated above, the intermediate product consists of a mixture of ammonium metaphosphate, phosphoronitridic acid, and ammonium phosphoronitridate. When this mixture is reacted with water the last two compounds are converted to ammonium metaphosphate according to the following reactions:

$$(OH)_2PN + H_2O \rightarrow NH_4PO_3 \quad (1)$$

$$NH_4OOHPN + H_2O \rightarrow NH_4PO_3 + NH_3 \quad (2)$$

The single nitrogen atom in phosphoronitridic acid and one of the two nitrogen atoms in ammonium phosphoronitridate are in non-ammoniacal form. In the hydrolysis reaction, the non-ammoniacal nitrogen in these compounds is converted to ammoniacal nitrogen.

It is not necessary, and in fact it is undesirable, to carry hydrolysis of the non-ammoniacal nitrogen to completion. We have found that best results are obtained when the ratio of ammoniacal nitrogen to total nitrogen in the final product is from about 0.80 to about 0.95. At ratios of less than about 0.80, the product is hygroscopic and its bulk density is low. At ratios above about 0.95 the product has a low hygroscopicity, but its bulk density is very low—about 15 pounds per cubic foot.

Another reason for not hydrolyzing all the non-ammoniacal nitrogen is to minimize loss of ammonia. It will be noted from Reaction 2 that hydrolysis of the non-ammoniacal nitrogen atom in ammonium phosphoronitridate results in the evolution of a nitrogen atom as ammonia. Our studies have shown that by reacting only part of the non-ammoniacal nitrogen in the mixture with water, ammonia loss can be held quite low. Apparently Reaction 1 takes place in preference to Reaction 2 if insufficient water is present to cause both reactions to go to completion. The hygroscopicity of our product is low even though it still contains considerable non-ammoniacal nitrogen. Since little ammonia is evolved in our process, most of the non-ammoniacal nitrogen in the final product must be present as ammonium phosphoronitridate. It appears, therefore, that the high hygroscopicity of the intermediate product is due to the presence of phosphoronitridic acid. Evidently when this compound is converted to ammonium metaphosphate the hygroscopicity of the product is greatly reduced.

For the foregoing reasons we control our process so that the amount of water actually reacted with the non-ammoniacal nitrogen in the intermediate product is less than that required to react with all the non-ammoniacal nitrogen. Not all the water, in the form of steam or liquid, applied to the intermediate product reacts with non-ammoniacal nitrogen; some inevitably escapes from the system. It will be recognized, therefore, that some experimentation will be required with any particular system to determine just how much water must be introduced so as to obtain a ratio of non-ammoniacal to total nitrogen in the final product of 0.80 to 0.95.

One method for carrying out the process of our invention is illustrated in the attached flow diagram. In the method shown, steam is used to hydrolyze the intermediate product.

As shown, intermediate product is introduced into inclined rotary drum reactor 1. The temperature of the material introduced is between about 60° and 150° F. Near the feed end of the drum the material is contacted with steam introduced via line 2. An excess of steam over that theoretically required is employed, because some steam escapes from the system without reacting. The material contacted with steam is brought to a temperature of about 212° to 500° F. We prefer to hold the temperature within the range of 225° to 300° F.

The hydrolysis reaction is exothermic. When the temperature of the intermediate product is fairly high, say about 150° F., it may be necessary to cool the material in the reaction zone to maintain its temperature below the preferred maximum of 300° F. This may be done conveniently by applying cooling water to the outside of the drum in the vicinity of the steam inlet. If the temperature of the intermediate product is low, say 60° F., it may be necessary to supply heat to bring the temperature of the material in the reaction zone to the preferred minimum of 225° F. This may be done by directing a flame on the drum exterior, or by passing heated gas through the drum.

The material is tumbled in the drum for about 2 minutes. As it passes through the drum the material is agglomerated to lumps ranging up to about 6 inches in diameter. The material discharged from the drum at a temperature of 225° to 400° F., is passed through rotary cooler 3, where its temperature is reduced to about 150° F. It is necessary to cool the material to about 150° F., because above that temperature the material becomes gummy when crushing is attempted. The cooled material is passed through crusher 4 and thence to double-deck screen 5. Screen sizes of 6 mesh and 35 mesh are suitable for this purpose. Material rejected by the 6-mesh screen is recycled to crusher 4. Minus 35-mesh material is recycled to reactor 1. The minus 6-plus 35-mesh material constitutes the product.

The relatively small amount of ammonia evolved in reactor 1 may, if desired, be recovered in ammonia-recovery equipment 6.

When liquid water is used to treat the intermediate product, the procedure is substantially the same as when steam is used, although temperatures down to 200° F. are operable with liquid water. It is best to introduce the water as a fine spray.

Despite its higher cost, it is advantageous to use steam rather than liquid water. Because it mixes better with the finely divided intermediate product, a more uniform final product is obtained with steam than with liquid water. For the same reason a lesser quantity of steam is required than liquid water. Another result of better mixing is that products of higher bulk density are obtained with steam. An additional advantage of steam over liquid water is that less external heat need be supplied when the intermediate product is introduced into the reactor at a low temperature.

Example I

A number of tests of our process were carried out in a small batch tumbler. The tumbler was a metal cylinder with a closed bottom; the cylinder was 10 inches in diameter by 10 inches deep. The tumbler was mounted with its axis at an angle of 20 degrees to the horizontal.

In one series of tests liquid water was added to the intermediate product. Steam was used in another series. In each of these tests 1.5 pounds of intermediate product was placed in the tumbler. The intermediate product contained 75.3 percent $P_2O_5$ and 18.2 percent nitrogen, of which 71.5 percent was in ammoniacal form. The tumbler was then rotated at a speed of 30 revolutions per minute. The intermediate product was heated by directing the flame of a Bunsen burner onto the shell of the tumbler. When the desired temperature was reached, the desired amount of water or steam was directed onto the bed of material. Water was sprayed onto the bed from an atomizing sprayer. Steam was directed onto the bed through a hose. Tests were made at temperatures of 150° to 350° F. Various amounts of water were added during a period of about 1.2 to 2 minutes. When the hydrolysis reaction took place the material agglomerated into one or more masses. Tumbling was continued until the surface of these masses had cooled and hardened. The product then was allowed to cool further and was crushed and screened to separate the minus 6-plus 35-size fraction.

In all tests run at temperatures less than 200° F. the material failed to agglomerate. In tests in which the temperature exceeded 300° F. a major portion of the material fused and stuck to the tumbler wall. A scraper or other means for removing adhering material from the tumbler wall would be necessary at temperatures of 300° F. or more.

Results of representative tests are given in the following table.

TESTS WITH LIQUID WATER

| Temperature at agglomeration, °F. | Chemical analysis of product, percent by weight | | | Bulk density of product, lb. per cu. ft. | Hygroscopicity of product: moisture absorbed, percent by wt.[1] |
|---|---|---|---|---|---|
| | $P_2O_5$ | Total N | Ammoniacal N | | |
| 200 | 71.7 | 17.0 | 14.8 | 34 | 7.2 |
| 275 | 72.1 | 17.2 | 14.6 | 46 | 8.9 |
| 300 | 72.8 | 17.3 | 14.5 | 47 | 10.4 |

TESTS WITH STEAM

| | | | | | |
|---|---|---|---|---|---|
| 210 | 73.1 | 17.5 | 15.3 | 46 | 7.0 |
| 240 | 72.6 | 17.2 | 14.8 | 47 | 11.8 |
| 260 | 72.8 | 17.5 | 14.7 | 57 | 14.3 |
| 285 | 73.3 | 17.5 | 14.9 | 57 | 11.8 |

[1] Hygroscopicity of intermediate product was 18.6 percent. Hygroscopicity determined by exposing 1-gram sample for 1 hour to atmosphere at 86° F., 70 percent relative humidity.

Example II

Tests of our process were carried out in larger scale equipment also. An inclined rotary drum 1 foot in diameter and 8 feet long was used as a reactor. The drum was mounted on a slope of 3/8 inch per foot. A 2-inch retaining ring was located at the feed end of the drum. A retaining ring 3/4 inch high was located 2 feet from the feed end. Intermediate product was fed from a belt feeder onto a chute entering the drum. Steam was introduced through a 1/2-inch pipe which extended 1 foot 9 inches into the drum. A 90-degree elbow and pipe nipple were attached to the end of the pipe to direct the steam flow onto the bed of material in the drum. The end of the pipe nipple was about 3 inches from the bed.

The unit was normally operated with drum speeds of 20 to 30 revolutions per minute and at feed rates of about 110 to 170 pounds of intermediate product per hour, which provided a bed about 1½ inches deep in the feed end of the drum. The retention time of the material in the drum was approximately 2 minutes. In the drum the intermediate product was first heated to a temperature of about 150° F. by an external burner. At the point at which steam was introduced, the bed temperature increased rapidly to about 225° to 275° F. by reaction with the steam. A stream of water was directed onto the outside of the drum at a point adjacent to the steam inlet to control the temperature and prevent sticking of the material to the drum. During the hydrolysis the light intermediate product was agglomerated rapidly to lumps ranging up to 6 inches in diameter. The product discharged from the tumbler at a temperature of about 250° to 300° F. It was allowed to cool to room temperature and was crushed and screened to give a product fraction of minus 6-plus 35-screen size.

Operating conditions and results of two typical pilot-plant runs are given in the following table.

|  | Run 1 | Run 2 |
|---|---|---|
| Operating conditions: | | |
| Hours operated | 8.1 | 10.8 |
| Intermediate product fed— | | |
| Pounds | 918.0 | 1828.5 |
| Pounds per hour | 113 | 170 |
| Steam rate— | | |
| Pounds | 140.1 | 243.0 |
| Pounds per hour | 17.3 | 22.5 |
| Temperature, ° F.— | | |
| Feed | 150 | 175 |
| At steam inlet | 250 | 270 |
| Product | 310 | 280 |
| Tumbler, revolutions per minute | 30 | 30 |
| Product | | |
| Weight, lbs | 972 | 1887 |
| Bulk density after crushing to −6+35 screen size, lb./cu. ft. | 42 | 41.5 |
| Screen analysis after crushing, percent by weight (U. S. sieve series)— | | |
| −6+12 | 58.1 | 51.7 |
| −12+20 | 22.3 | 26.8 |
| −20+35 | 15.4 | 17.2 |
| −35 | 4.2 | 4.2 |
| Percent nonammonical nitrogen converted to ammoniacal nitrogen | 24.1 | 29.4 |

Chemical analyses of the intermediate and final products and results of hygroscopicity tests are given in the following table.

|  | Run 1 | | Run 2 | |
|---|---|---|---|---|
|  | Intermediate product | Final product | Intermediate product | Final product |
| Chemical analysis, percent by weight: | | | | |
| Phosphorus | 76.7 | 72.8 | 76.9 | 73.6 |
| Total nitrogen | 18.2 | 16.1 | 18.0 | 16.7 |
| Ammoniacal nitrogen | 12.8 | 13.4 | 12.9 | 13.8 |
| N:P atomic ratio | 1.20 | 1.12 | 1.19 | 1.15 |
| Ammoniacal N, percent of N | 70 | 83 | 72 | 83 |
| Hygroscipicity,[1] percent water absorbed | 18.6 | 8.0 | 18.6 | 8.4 |

[1] Conditions of hygroscopicity test: 1-gram sample exposed 1 hour to atmosphere having temperature of 86° F., 70% relative humidity.

Calculations show that the amount of steam introduced in each of the runs was approximately 5 times the amount that actually reacted with nonammoniacal nitrogen.

*Example III*

Our process was carried out also in a stationary furnace. Five pounds of intermediate product to which 10 percent by weight of water had been added was placed on a tray in a layer about 1 inch thick. This tray, with its layer of material, was introduced into a small electric furnace and was heated at 450° F. for 30 minutes. Upon heating the light, fluffy intermediate product was converted to a sheet which was semi-plastic while hot but was hard and brittle when cool. The sheet was allowed to cool and was crushed. The bulk density of the final product after sizing to minus 6 plus 35 screen size was 40 pounds per cubic foot. The chemical analysis and hygroscopicity of the product were as follows:

*Chemical analysis and hygroscopicity*

|  | Intermediate product | Final product |
|---|---|---|
| Chemical analysis, percent by weight: | | |
| Phosphorus | 76.0 | 73.5 |
| Total nitrogen | 17.5 | 14.5 |
| Ammoniacal nitrogen | 12.2 | 13.6 |
| N:P atomic ratio | 1.17 | 1.00 |
| Ammoniacal N, percent of total nitrogen | 70 | 94 |
| Hygroscopicity,[1] percent water absorbed | 17.6 | 2.6 |

[1] Conditions of hygroscopicity test: 1-gram sample exposed 1 hour to atmosphere having temperature of 86° F., 70 percent relative humidity.

We claim as our invention:

1. A process for the production of a fertilizer material of high bulk density and low hygroscopicity which comprises introducing an intimate mixture of ammonium metaphosphate, phosphoronitridic acid, and ammonium phosphoronitridate, said mixture having an atomic ratio of nitrogen to phosphorus in the range from 1.05 to 1.35 and having from 60 to 75 percent of its nitrogen in ammoniacal form, into a hydrolysis zone; therein hydrolyzing the mixture with water to such extent that from about 80 percent to 95 percent of its nitrogen content is present in ammoniacal form; maintaining the material within the temperature range from about 200° F. to the decomposition point of the material during hydrolysis; and cooling, crushing, and sizing the product.

2. The process of claim 1 wherein the water required for hydrolysis is introduced into the material in the hydrolysis zone in the form of steam and the temperature of the material is maintained in the range from 212° F. to the decomposition point of the material.

3. A process for the production of a granular fertilizer material of high bulk density and low hygroscopicity which comprises introducing an intimate mixture of ammonium metaphosphate, phosphoronitridic acid, and ammonium phosphoronitridate, said mixture having an atomic ratio of nitrogen to phosphorus in the range from 1.05 to 1.35 and having from 60 to 75 percent of its nitrogen in ammoniacal form, into a hydrolysis zone; therein hydrolyzing the mixture with water to such extent that from about 80 percent to 95 percent of its nitrogen content is present in ammoniacal form; maintaining the material within the temperature range from about 200° F. to the decomposition point of the material during hydrolysis; agglomerating the material by tumbling it in the hydrolysis zone during hydrolysis; and cooling, crushing, and sizing the product.

4. A process for the production of a granular fertilizer material of high bulk density and low hygroscopicity which comprises introducing an intimate mixture of ammonium metaphosphate, phosphoronitridic acid, and ammonium phosphoronitridate, said mixture having an atomic ratio of nitrogen to phosphorus in the range from 1.05 to 1.35 and having from 60 to 75 percent of its nitrogen in ammoniacal form, into a hydrolysis zone; therein hydrolyzing the mixture wtih water to such extent that from about 80 percent to 95 percent of its nitrogen content is present in ammoniacal form; maintaining the material within the temperature range from about 225° F. to 300° F. during hydrolysis; agglomerating the material by tumbling it in the hydrolysis zone during hydrolysis; and cooling, crushing, and sizing the product.

5. The process of claim 4 wherein the water required for hydrolysis is introduced into the material in the hydrolysis zone in the form of steam.

6. The process of claim 4 wherein the water required for hydrolysis is sprayed upon the surface of the tumbling material in the hydrolysis zone.

References Cited in the file of this patent

UNITED STATES PATENTS

| 2,064,979 | Kaselitz | Dec. 22, 1936 |
| 2,136,793 | Gabeler et al. | Nov. 5, 1938 |
| 2,287,759 | Hardesty et al. | June 23, 1942 |
| 2,448,126 | Shoeld | Aug. 31, 1948 |
| 2,713,536 | Driskell | July 9, 1955 |